(12) United States Patent
Henry

(10) Patent No.: US 9,082,092 B1
(45) Date of Patent: Jul. 14, 2015

(54) INTERACTIVE DIGITAL MEDIA ITEMS WITH MULTIPLE STORYLINES

(71) Applicant: GOOGLE INC., Mountain View, CA (US)

(72) Inventor: Colleen Henry, Oakland, CA (US)

(73) Assignee: Google Inc., Mountain View, CA (US)

( * ) Notice: Subject to any disclaimer, the term of this patent is extended or adjusted under 35 U.S.C. 154(b) by 212 days.

(21) Appl. No.: 13/632,927

(22) Filed: Oct. 1, 2012

(51) Int. Cl.
*G06F 3/14* (2006.01)
*G06Q 10/06* (2012.01)

(52) U.S. Cl.
CPC ...................... *G06Q 10/06* (2013.01)

(58) Field of Classification Search
CPC ...................... G06F 3/14; G06F 3/17
USPC .......... 715/200–277, 700–867; 700/701–866;
709/201–229; 705/2, 14.53, 50–29;
345/30–111; 725/37; 386/281
See application file for complete search history.

(56) References Cited

U.S. PATENT DOCUMENTS

| | | | |
|---|---|---|---|
| 7,784,069 B2 | 8/2010 | Boss et al. | |
| 2009/0297118 A1 | 12/2009 | Fink et al. | |
| 2010/0235857 A1* | 9/2010 | Lestage et al. | 725/37 |
| 2011/0125521 A1* | 5/2011 | Dhoble | 705/2 |
| 2013/0036201 A1* | 2/2013 | McLaughlin | 709/219 |
| 2013/0294750 A1* | 11/2013 | Fu et al. | 386/281 |
| 2014/0040026 A1* | 2/2014 | Swaminathan et al. | 705/14.53 |

\* cited by examiner

*Primary Examiner* — Ruay Ho
(74) *Attorney, Agent, or Firm* — Lowenstein Sandler LLP

(57) ABSTRACT

A group of streaming video segments that includes a first set of streaming video segments that are associated with a first storyline is identified. The first set of streaming video segments is provided to a client device. The first set of streaming video segments includes data indicative of a set of storyline options associated with the first storyline. User input indicating a user selection of one of the storyline options is received and the group of streaming video segments is updated to include a second set of streaming video segments based on the user input. The second set of streaming video segments is provided to the client device.

17 Claims, 10 Drawing Sheets

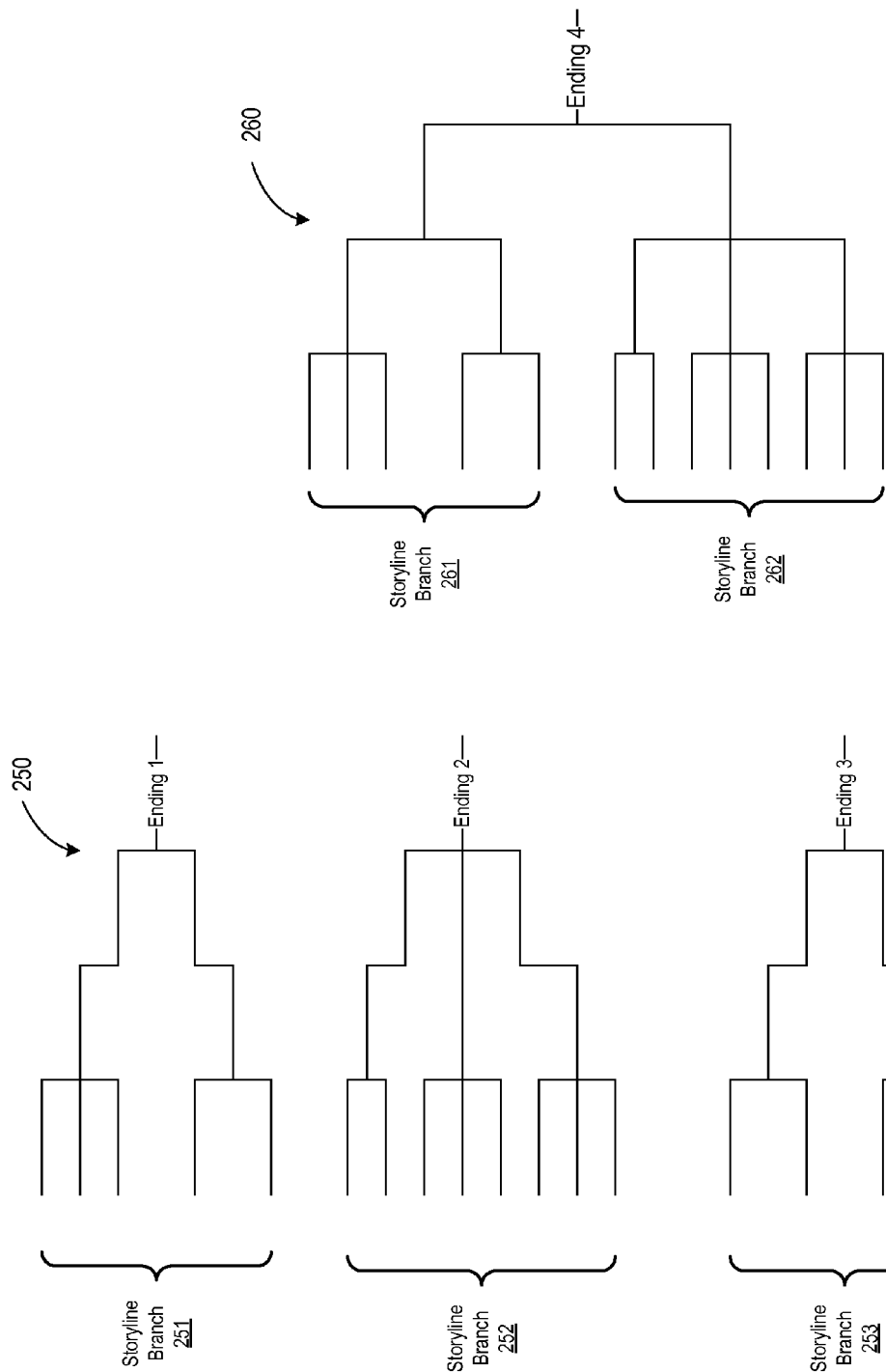

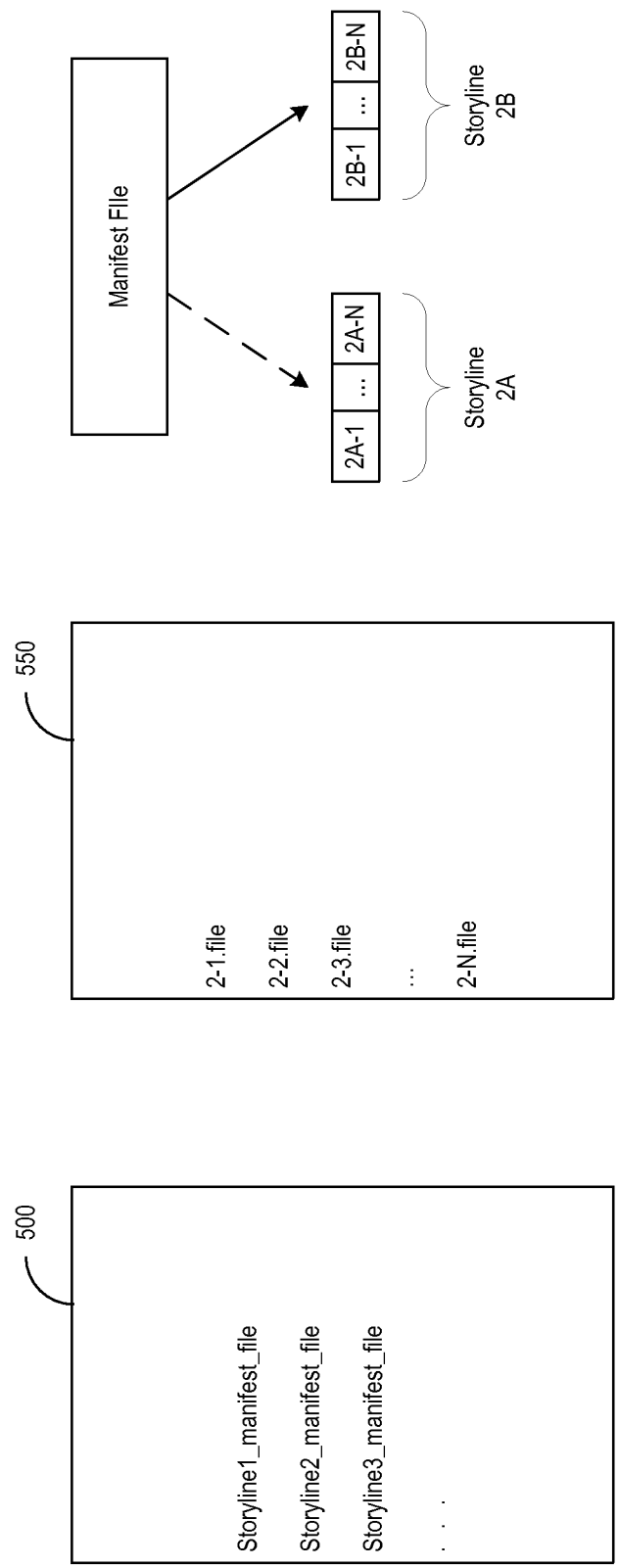

INTERACTIVE DIGITAL MEDIA ITEMS WITH MULTIPLE STORYLINES

TECHNICAL FIELD

Embodiments of the present disclosure relate to the field of digital media items and, more particularly, to interactive digital media items.

BACKGROUND

Computing devices such as smart phones, cellular phones, laptop computers, desktop computers, netbooks, tablet computers, etc., are commonly used for a variety of different purposes. Users often use computing devices to user, play, and/or consume digital media items (e.g., view digital images, watch digital video, and/or listen to digital music). A digital media item may be streaming content or locally stored content. Streaming content (e.g., a streaming video) may be content which is not stored locally on a computing device in advance, but rather, is presented to the user while being received from another computing device (e.g., a content server). Locally stored content may be content which is stored in a local memory (e.g., a hard disk) of the computing device.

Digital media items such as digital videos (both streaming and local videos) often have fixed storylines. For example, a digital video may present a story (e.g., a storyline) to a user and the user may only be able to view this story without being able to interact with the digital video (e.g., may not be able to provide user input) and the storyline or events that occur in the digital video may not be changeable (e.g., the storyline for a digital video is generally always the same).

SUMMARY

In one embodiment, a method of providing interactive digital media items is provided. The method may identify a group of streaming video segments. The group of streaming video segments includes a first set of streaming video segments that are associated with a first storyline. The method may also provide the first set of streaming video segments to a media player. The first set of streaming video segments may include data indicative of a set of storyline options associated with the first storyline. The method may receive user input indicating a user selection of a storyline option from the set of storyline options associated with the first storyline. The method may update the group of streaming video segments to include a second set of streaming video segments based on the user input indicating the user selection of one storyline option associated with the first storyline. The second set of streaming video segments is associated with a second storyline and may not have been previously included in the group of streaming video segments. The method also provides the second set of streaming video segments to the media player.

In one embodiment, the group of streaming video segments may be updated by updating a manifest file to include references to the second set of streaming video segments. In another embodiment, the group of streaming the group of streaming video segments may be updated by replacing or overwriting a previous set of streaming video segments with the second set of video segments.

In one embodiment, the method may be store storyline data indicative of one or more storyline options selected by a user viewing an interactive digital media item on a first client device. The storyline data may be provided to a second client device which includes a game engine to run a video game. A story and/or a storyline in the video game may be updated based on the storyline data.

In another embodiment, the method may receive storyline data and may update a group of streaming video segments to include a set of streaming video segments based on the storyline data. A least a portion of the storyline data may be received from a video game on a first client device. The method may provide the set of streaming video segments to a second client device.

In additional embodiments, computing devices for performing the operations of the above described embodiments are also implemented. Additionally, in embodiments of the disclosure, a computer readable storage media may store instructions for performing the operations of the embodiments described herein.

The above summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

BRIEF DESCRIPTION OF THE DRAWINGS

The present disclosure will be understood more fully from the detailed description given below and from the accompanying drawings of various embodiments of the disclosure.

FIG. 2B illustrates an exemplary storyline map, according to another embodiment.

FIG. 2C illustrates an exemplary storyline map, according to a further embodiment.

FIG. 5A illustrates an exemplary a manifest file, according to a fourth embodiment.

FIG. 5B illustrates an exemplary manifest file, according to a fifth embodiment.

FIG. 6 is a block diagram illustrating modifications to video file segments, according to one embodiment.

DETAILED DESCRIPTION

System and methods for providing an interactive digital media item are disclosed herein. An interactive digital media item may be a digital media item which allows for changes in the events or storyline of the digital media item, based on user input. For example, an interactive digital media item may be a digital video that presents a user with the ability to select whether a character in the story should go upstairs or downstairs. The interactive digital media item may be an interactive movie, where the story and/or storylines of the interactive movie are not fixed (e.g., can be changed when it is being presented to a user). A user may be presented with storyline options at multiple points in the interactive movie. Based on the user's selection of one or more storyline options, the interactive movie may present different storylines and may allow a user to control the story (e.g., to interact with the movie).

The interactive movie may be part of a video game or may be associated with the video game that is run (e.g., played) on a different client device (e.g., on a separate computer, on a gaming console, etc.). The storyline options selected by the user in the interactive movie may affect storyline options that are presented or events that occur in a video game, and the storyline options presented in a video game may also affect storyline options that may be presented in the interactive movie.

The interactive movie allows users to control the story and/or storylines whereas users were previously able to view only a fixed story or storyline. This may increase a user's enjoyment of the interactive movie or may increase the user's interest in the interactive movie because the decisions of the user may affect the outcome or ending of the interactive movie. Because the interactive movie allows a user to select different storyline options, the interactive movie may also be considered a video game or may be considered part of the video game. This may allow a user to continue playing the video game even though the user is not using a gaming console (e.g., an XBOX®). The interactive movie may also use standard network streaming video standards, protocols and/or formats, which may allow the interactive movie to be viewed on any computing device that support the network streaming video standards, protocols and/or formats. The interactive movie may be pre-rendered video which allows computing devices with less powerful hardware to view the interactive movie.

Figure 1:
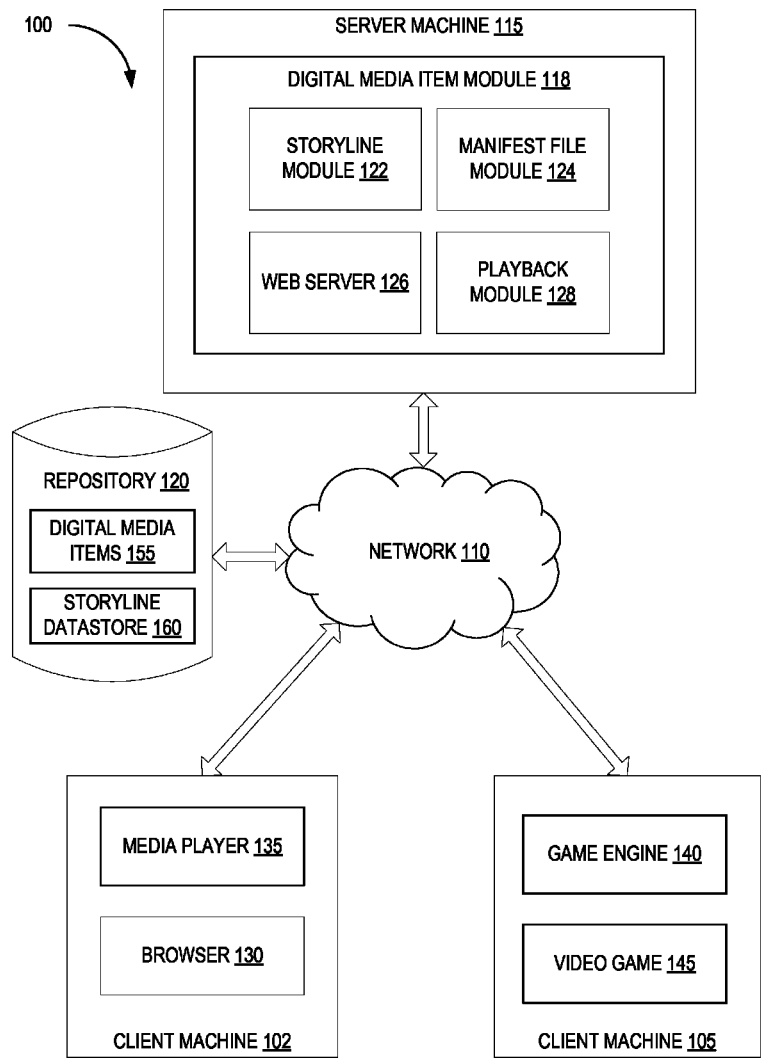
FIG. 1 illustrates an exemplary system architecture, in accordance with one embodiment of the present disclosure.

FIG. 1 illustrates an exemplary system architecture 100, in accordance with one embodiment of the present disclosure. The system architecture 100 includes a server machine 115, a repository 120, and client machines 102 and 105, connected to a network 110. Network 110 may be a public network (e.g., the Internet), a private network (e.g., a local area network (LAN) or wide area network (WAN)), a wired network (e.g., Ethernet network), a wireless network (e.g., an 802.11 network), a cellular network (e.g., a Long Term Evolution (LTE) network), a broadcast network, and/or a combination thereof.

The server machine 115 may be a computing device such as a rackmount server, a router computer, a server computer, a personal computer, a portable digital assistant, a mobile phone, a laptop computer, a tablet computer, a desktop computer, a media center, or any combination of the above.

In one embodiment the server machine 115 may provide interactive digital media items (e.g., may provide one or more video segments for an interactive digital video) to the client 102. An interactive digital media item may present an interactive story to users. The interactive story may include multiple storylines and the storylines may be presented to the user based on user input. The interactive digital media item may include groups or sets of video segments, where each group/set of video segments is associated with one of the multiple storylines that may be provided to the user. Different groups or sets of video segments may be provided to the user or to the client 102, based on user input received from the client 102. For example, if the user provides user input selecting a first option (e.g., an option indicating that character should duck), the server machine 115 may provide a first set of video segments associated with a first storyline to the client 102, and if the user provides user input selecting a second option (e.g., an option indicating that character should run and hide), the server machine 115 may provide a second set of video segments associated with a second storyline to the client 102.

In one embodiment, the interactive digital media items may include one or more decision points or storyline options. The decision points or storyline options represent different branches of a story (e.g., different storylines) that may be presented to the user. For example, a decision point or storyline option may be whether a character in the story of the digital video should go left or go right. The interactive digital media item may provide the storyline options (e.g., decision points) to the user (e.g., one or more of the segments video segments associated with the current storyline or branch may display a prompt or a list of the storyline options). The user may provide user input indicating a selection of one of the storyline options and the client 102 may provide user input to the server. Based on the storyline option selected by the user, the server 115 may select another storyline (e.g., another branch of the story) and may provide video segments associated with the selected storyline to the client 102 (e.g., provide the video segments of the digital media item that show or display the selected storyline).

In one embodiment, the interactive digital media item may start with an initial storyline. The initial storyline may provide one more storyline options (e.g., branches) and each of the storylines associated with the storyline options (e.g., each of the branches) may, in turn, provide other storyline options (e.g., other branches or storylines). In one embodiment, once a storyline is selected, the interactive digital media item may present only the storylines which result from or flow from the selected storyline. For example, if a user chooses to go to a first country rather than a second country, only storylines that occur in the first country may be presented in the interactive digital media item. In another example, if a user chooses to save a first character in the story rather than save a second character in the story, only storylines which include the first character may be presented in the interactive digital media item.

In one embodiment, the interactive digital media item may have multiple endings or endpoints. For example, if the user chooses to go to a first country at some point in the story, the story for the interactive digital media item may have a first ending (e.g., a character marries and settles down in the first country), but if the user chooses to go to a second country, the story for the interactive digital media item may have a second ending (e.g., the character never gets married). In another embodiment, the storylines for the interactive digital media item may converge onto a common ending or common endpoint. For example, the story for an interactive digital media item may be about World War II (WWII). Although a user may choose different storyline options (e.g., go to France instead of going to England), the ending or endpoint of the story may remain the same (e.g., the Allied powers win WWII).

As discussed above, the story of a digital media item may present multiple storylines which may diverge (based on storyline options selected by a user) and may later converge into a single ending or into one out of many possible endings. In one embodiment, the storylines may be organized into "acts" which may present a plot or sub-plot in the story of the interactive digital media item. Each act may include multiple storylines. Each act may include "missions" or "side quests" which may also include multiple storylines. In one embodiment, these missions or side quests may affect the storylines presented in the digital media item (e.g., the storyline options selected by a user in a mission may affect the ending of the interactive digital media item). In another embodiment, these missions or side questions may not affect the storylines presented in the digital media item (e.g., the side quest may not result in a separate branch in the story).

An exemplary story map (e.g., a tree representing how different storylines or branches are connected) which shows a story including different storylines/branches, is discussed in more detail below, in conjunction with FIGS. 2A to 2C.

In one embodiment, a user may begin viewing an interactive digital media item on a first client machine, select one or more storyline options for the digital media item, and continue viewing the interactive digital media item on a second client machine. For example, a user may select a first storyline option on a first client machine and may stop viewing the interactive digital media item on the first client machine. The user may resume viewing the interactive digital media item on a second client machine, and the server may resume playing the interactive digital media item starting from where the user previously stopped (e.g., at the storyline for the first storyline option selected by the user) and may provide additional storyline options.

In one embodiment, the interactive digital media item provided by the server 115 may be part of a video game or may be associated with the video game. For example, a user may use the client machine 105 (e.g., a gaming platform/console such as an XBOX®) to play a video game 145 using a game engine 140 (as discussed further below). Video games may generally refer to electronic games that involve human interaction (e.g., via user interface or controller). The video games may generate visual feedback (e.g., may display graphics, such as an avatar or a character running/shooting) on a video device (e.g., a liquid crystal display (LCD), a touch screen etc.). Computing devices that are used to download and/or play video games may be referred to as game platforms or gaming platforms (e.g., the personal computer (PC) platform), the XBOX® platform, the PlayStation® platform, etc.). These gaming platforms may often use gaming engines in order to allow users to play video games. A game engine may be a software framework that allows users to create and/or play games on a particular gaming platform (e.g., on a PC or on an XBOX®). The game engine may render graphics (2-dimensional and/or 3-dimensional graphics) in real time, may perform physics calculations (e.g., movement or collision detection), may provide audio for the video game, animation for the video game, etc. Because the game engine renders graphics in real-time and performs many other functions (e.g., physics calculations), computing devices often use more powerful hardware (e.g., faster processors, more memory, etc.) to execute the game engine.

The client machine 105 may allow a user more control when playing a video game. For example, the client machine 105 may allow a user to control a character in the video game (e.g., control a character's movement, such as running, crouching, swinging a sword, shooting a gun, etc.). The client machine 105 may allow the user to experience a story for the video game by controlling the character (e.g., the user controls a character that fights through France in WWII). The actions of the user may affect the storylines of the story for the video game (e.g., similar to the storyline/branches of the interactive digital media item discussed above). A user may stop playing the game on the client machine 105 and may begin viewing an interactive digital media item that is part of the video game or that is associated with the video game, using the media player 135 of the client machine 102.

In one embodiment, the interactive digital media item may continue the story and/or storylines for the video game. For example, the interactive digital media item may be an interactive digital video that presents a storyline starting from where the user previously stopped playing in the video game on the client machine 105. In another example, the interactive digital media item may be an interactive digital video that presents a corollary storyline that is associated with the story in the video game (e.g., the interactive digital video may allow a user to complete a side-quest or a side branch of the story in the video game). The interactive digital video may provide the user with storyline options and the user may select one of the storyline options to further the story of the video game. The server 115 may store the storyline options of the interactive digital media item selected by the user (e.g., storyline data), in the repository 120. In one embodiment, when the user later continues playing the video game 145 on the client machine 105, the story of the video game 145 may reflect the storyline options selected by the user when the user viewed the interactive digital media item on client machine 102 (e.g., the storyline options selected by the user in the interactive digital media item may affect the story and/or storylines of the video game). In another embodiment, the actions of the user in the video game 145 may also affect the storylines presented in interactive digital media items. The server 115 may store data indicative of the actions, events, and/or storylines that occurred while the user played the video game 145 (e.g., storyline data). The server 115 may present storylines in the interactive digital media items based on the storyline data. For example, if the user is unable to prevent a building from being destroyed in the video game 145, then when the user later views an interactive digital media item that is part of the video game 145, only storylines in which the building is destroyed may be presented to the user.

In one embodiment, the server 115 may use an adaptive bit rate streaming architecture to provide interactive digital media items (e.g., the video segments that make up the interactive digital media items) to client machines (e.g., client machine 102). Generally, an adaptive bit rate streaming architecture may dynamically provide different qualities (e.g., different bit rates) of a streaming video to client machines. For example, a streaming video may have a high quality (e.g., a 1080p quality) version and a low quality (e.g., a 320p quality) version. Based on the bandwidth capability of a client machine, a different quality version of the streaming video may be provided to the user. A client machine may initially have low bandwidth and the adaptive bit rate streaming architecture may initially provide the low quality version of the streaming video to the client machine. If the bandwidth capability of the client machine increases, the adaptive bit rate streaming architecture may start providing the high quality version of the streaming video to the client machine. The adaptive bit rate streaming architecture may divide each version of the streaming video into smaller sized segments (e.g., streaming video segments that are 5 seconds long, 1 minute long, etc.). The adaptive bit rate streaming architecture may use manifest files to provide the video segments to the client machine.

A manifest file may be a file (e.g., a text file) which includes references or points to other manifest files and/or to one or more video segments of a streaming video. A top-level manifest file may include references or pointers (e.g., universal resource locators (URLs)) to one or more lower-level manifest files. The lower-level manifest files may provide references or pointers to a portion of the streaming video (e.g., streaming video segments) at a certain quality or bit rate. As the bandwidth capability of the client machine changes, the adaptive bit rate streaming architecture may update a reference in the top-level manifest file to point to a different lower-level manifest file. For example a first lower-level manifest file may include references to high quality streaming video segments for a portion of a streaming video and the top-level manifest file may initially include a reference to the first lower level manifest file. However, if the bandwidth capability of the client machine decreases, the adaptive bit rate streaming architecture may update the top-level manifest file to point to a second lower-level manifest file that includes references to low quality streaming video segments for the same portion of the streaming video.

In one embodiment, the server 115 may update the manifest files associated with an interactive digital media time so that video segments associated with the storyline selected by a user, are provided to the client devices. For example, if a user picks a second storyline option out of three different storyline options, the server 115 may update one or more manifest files to include references to the video segments associated with the second storyline option.

Examples of adaptive bit rate streaming architectures include, but are not limited to, Adobe Dynamic Streaming for Flash®, HTTP Live Streaming (HLS), Microsoft Smooth Streaming, Octoshape Multi-BitRate, Dynamic Adaptive Streaming over HTTP, etc. Although not all adaptive bit rate streaming architectures use two levels of manifest files, adaptive bit rate streaming architectures generally modify one or more manifest files to dynamically adjust the quality level of streaming video segments that are provided to a client device.

In one embodiment, server machine 115 includes a digital media item module 118 configured to provide interactive digital media items to one or more client machines (e.g., client machine 102) and to receive storyline data from client machines (e.g., client machines 102 and 105). The digital media item module 118 includes a storyline module 122, a manifest file module 124, a web server 126, and a playback module 128. In alternative embodiments, the storyline module 122, the manifest file module 124, the web server 126, and the playback module 128 may run on different machines (e.g., may reside on different server machines or different computing devices). Additionally, some or all of the storyline module 122, the manifest file module 124, the web server 126, and the playback module 128 may be combined into a single module or separated into additional modules.

In one embodiment, the storyline module 122 may manage and/or track the storylines for the interactive digital media item and/or the video game 145. For example, as the user provides user input selecting different storyline options when viewing the interactive digital media item, the storyline module 122 may receive the input from the client machine 102 and may store data indicative of the user input (e.g., storyline data indicative of which storylines were selected by the user) in the storyline datastore 160 of the repository 120. In another example, the storyline module 122 may receive storyline data from the client machine 105 as the user plays the video game 145 on the client machine 105. The storyline module 122 may store this storyline data (e.g., data indicative of events, actions, and/or storylines that occurred while a user played the video game 145) in the storyline datastore 160. In another embodiment, the user may indicate that the user does not wish to have the storyline data stored and/or tracked. For example, the user may send a message/email to the server indicating that the user does not want the storyline data stored and/or tracked. In another example, the user may change an account setting in a user account to indicate that that the user does not want the storyline data stored and/or tracked. If the user does not want the storyline data stored and/or tracked, the storyline module 122 may not store the storyline data.

In another embodiment, the storyline module 122 may identify different storylines that should be presented to the user, based on the storyline data in the storyline datastore 160. For example, based on storyline options selected in an interactive digital media item and/or storylines that occurred in the video game 145, the storyline module 122 may identify six different storyline options that may be presented to a user in an interactive digital media item and each of the storylines associated with the six different storyline options may, in turn, lead to other storyline options. In another example, the storyline module 122 may update the storylines that a user may experience in the video game based on storyline options selected in an interactive digital media item and/or storylines that occurred in the video game 145. The storyline module 122 may use a storyline map (as discussed later below in conjunction with FIGS. 2A to 2C) to identify the storylines that should be presented to the user.

As discussed above, in one embodiment, the server 115 may use an adaptive bit rate architecture to provide the video segments for different storylines to the client machine 102. The manifest file module 124 may provide a top-level manifest file to the client machine 102. The top-level manifest file may include references (e.g., URLs or other pointers) to lower-level manifest files. The lower-level manifest files may include references to video segments associated with different storylines. In one embodiment, as the user selects different storyline options/branches (as discussed above) the manifest file module 124 may update the top level manifest file to include references to different lower-level manifest files, based on the storyline options selected by the user. Examples of the modifications that may be made to a top level manifest file are discussed in more detail below in conjunction with FIGS. 3A, 3B, and 4. In another embodiment, the manifest file module 124 may provide the updated top-level manifest file and one or more lower-level manifest files to the client machine 102 after modifying the top-level manifest file. For example, if the top-level manifest file is updated to include a lower-level manifest file that was not previously provided to the client machine, the manifest file module 124 may provide the updated top-level manifest file and the lower-level manifest file to the client machine.

In one embodiment, the manifest file module 124 may not update the manifest top-level manifest file to include references (e.g., URLs) to different lower-level manifest files based on user input. The manifest file module 124 may modify, update, replace and/or overwrite the video segments that are referenced by the lower-level manifest file. For example, a lower-level manifest file may refer to a first set video segments associated with a first storyline. When the user selects a storyline option associated with a second storyline, the manifest file module 124 may update or replace the first set of video segments referenced by the lower-level manifest file with a second set of video segments that associated with the second storyline, rather than updating the top-level manifest file to refer to a different lower-level manifest file. Examples of the modifications or updates to the video file segments are discussed in more detail below in conjunction with FIGS. 5A, 5B, and 6.

In one embodiment, the web server 126 may serve requests for interactive digital media items (e.g., video and/or audio) that are received from the client 102. Web server 126 may receive search queries and perform searches on the digital media items 155 in the repository 120 to determine digital media items that satisfy the search query. Web server 126 may then send to client 102 those digital media items that match the search query. Client 102 may also obtain information on digital media items that are contained in the repository 120, such as by navigating a web page that provides digital media items and/or selecting one or more filters provided by the web server 126. Web server 126 may coordinate with playback module 128 to stream digital media items to client 102, or may download the digital media items to the client 102. Web server 126 may also receive digital media items from client 102, and store those digital media items in repository 120.

Playback module 128 sends, streams or otherwise provides digital media items to requesting users (e.g., an end user, a client machine, a business entity, a web bot (a software application that runs an automated task over the Internet), or any other program, individual or organization). Playback module 128 may stream or download an interactive digital media item (e.g., the video file segments for the interactive digital media item that may be associated with different storylines in the interactive digital media item) to the client 102, and media player 135 executing on the client 102 may play the interactive digital media item.

Repository 120 is a persistent storage that is capable of storing audio files and/or video files. Repository 120 may be a network-attached file server or some other type of persistent storage such as an object-oriented database, a relational database, and so forth, that may be hosted by the server machine 115 or one or more different machines coupled to the server machine 115 via the network 110. The digital media items 155 stored in the repository 120 may include interactive digital media items (e.g., digital media items that allow a user to control or change the storylines presented in the story for the digital media item). The repository 120 also includes a storyline data store 160 which may include and/or store storyline data. The storyline data may include data indicative of actions or events that occurred in an interactive digital media item, and/or one or more storyline options selected by a user when viewing an interactive digital media item. The storyline data may also include data indicative of actions, events, and/or storyline that occurred when a user plays video game 145 on the client machine 105.

The client machine 102 may be a computing device, such as a personal computer (PC), a laptop, a smart phone, a tablet computer, a cellular phone, a netbook, etc. The client machines 102 may run an operating system (OS) that manages hardware and software of the client machine 102. Browser 130 may run on the client machines (e.g., on the OS of the client machines). The browser 130 may be a web browser that can access, retrieve, present, and/or navigate content (e.g., web pages such as Hyper Text Markup Language (HTML) pages, digital media items, etc.) served by a web server (e.g., web server 126). The browser 130 may render, display, and/or present the content (e.g., a web page) to a user. The browser 130 may issue queries and commands to the web server 126, such as commands to access a specific digital media item, commands to share the digital media item, and so forth. The client machine 102 may also upload digital media items to the server machine 115 for storage, using the browser 130.

In one embodiment, client machine 102 also includes a media player 135 that is configured to play digital media items, such as interactive digital media items. Media player 135 may be a video player and/or an audio player. Media player 135 may be a standalone application, may be a part of another application (e.g., may be part of the browser 130) or a plugin to another application (e.g., to a web browser), or may be executable code such as JavaScript that is executed by, for example, a web browser. The media player 135 may be capable of playing or displaying streaming digital media items (e.g., streaming video) or of playing locally stored digital media items (e.g., digital media items stored in a memory of the client machine 102).

In one embodiment, the media player 135 may present one or more storyline options to a user. For example, the media player 135 may display a list of storyline options, using various graphical user interface elements (e.g., buttons, check boxes, text fields, radio buttons, drop down menus, etc.). In another embodiment, the media player 135 may receive user input indicating a selection of one or more of the storyline options. The media player 135 may provide this user input to the server machine 115. For example, the media player 135 may provide an HTTP POST request or message to the server to indicate that a user has selected a particular storyline option. In other embodiments, various other types of message, data, or procedures calls may be used by the media player 125 to provide an indication of a selection of a storyline option to the server machine 115.

In one embodiment, the media player 135 may be an embedded media player. An embedded media player may be a media player which is inserted (e.g., embedded) into the HTML code of a web page. The web page includes HTML code which inserts (e.g., embeds) the media player into the web page. The embedded media player may be rendered/displayed when the web browser 130 renders (e.g., displays) the web page to the user. For example, the embedded media player may be inserted into a web page using a variety of HTML tags/elements (e.g., the embed tag, the video tab, the object tag, the iframe tag, etc.).

The client device 105 may be a gaming platform (e.g., a PC, a PlayStation®, or an XBOX®) that is configured to play video game 145 using a game engine 140. For example, the game engine 140 may be used to display the graphics (e.g., an avatar running, shooting, jumping, etc.) for a video game on a display (e.g., an LCD a touch screen) that is coupled to or is part of the client 105. In one embodiment, the client 105 may have better or faster hardware components than the client 102. For example, the client 102 may be a smart phone and the client 105 may be a PC or a gaming console which has a faster CPU, more memory, a better graphics card (e.g., a faster graphics processing unit (GPU)), etc. Thus, the client 105 may be able to execute/run the game engine 140 to play video game 145, but the client 102 may not be able to execute the game engine 140.

Embodiments of the present disclosure allow a user to interact with an interactive digital media item that presents multiple storyline options to a user. The story of the interactive digital media item may be updated to include different storylines, based on user input provided by the user (e.g., based on the user selection of a particular storyline option). This may allow the user to control the story of the interactive digital media item.

In one embodiment, the interactive digital media item may provide a video game-like experience to the user because the user may able to control the story of the interactive digital media item (e.g., control the actions of a character in the story), similar to how a user may control a character's actions in a video game. Thus, the interactive digital media item may also be considered a video game. The interactive digital media item may be appropriate for a casual gamer (e.g., a user who does not play games often) as it may "played" (e.g., viewed) using little or no skill (e.g., the user does not need to aim a gun quickly and/or accurately as may be required in a video game).

In one embodiment, the interactive digital media item (e.g., the groups of streaming video segments) may be pre-rendered video segments (e.g., a pre-rendered video or pre-rendered video segments that are not rendered in real-time by the hardware that is outputting or playing back the video) In one embodiment, a pre-rendered video may be a recording of a footage that was previously rendered on different hardware that is typically more powerful (e.g., has more processing capability) than the hardware used for playback. Digital videos (e.g., digital media items) are generally pre-rendered. Because the interactive digital media item is pre-rendered, the interactive digital media item may be viewed or presented on more computing devices because less powerful computing devices (e.g., computing devices that have a slower CPU, less memory, a slower GPU), can more easily display pre-rendered video. Compare this with a video games which often require more powerful computing devices (e.g., computing devices with a faster CPU, more memory, etc.) in order to execute the game engine that is used to play the video games. Because the interactive digital media item is pre-rendered, the interactive digital media item (which may include digital video such as computer generated imagery (CGI), live action video, etc.) displayed by the client 102 may be of higher quality than graphics rendered by a game engine for a video game on client 105, even though the client machine 105 that may be more powerful (e.g., may have a faster processor, have more memory, etc.).

In one embodiment, the interactive digital media item may be based on a network streaming video standards, protocols and/or formats (e.g., moving picture experts group-2 (MPEG-2) format, MPEG-4 (MP4) format, DivX format, Flash format, etc.). This may allow the interactive digital media item to be viewed on different types of client machines that support the network streaming video protocols and/or formats.

Figure 2A:
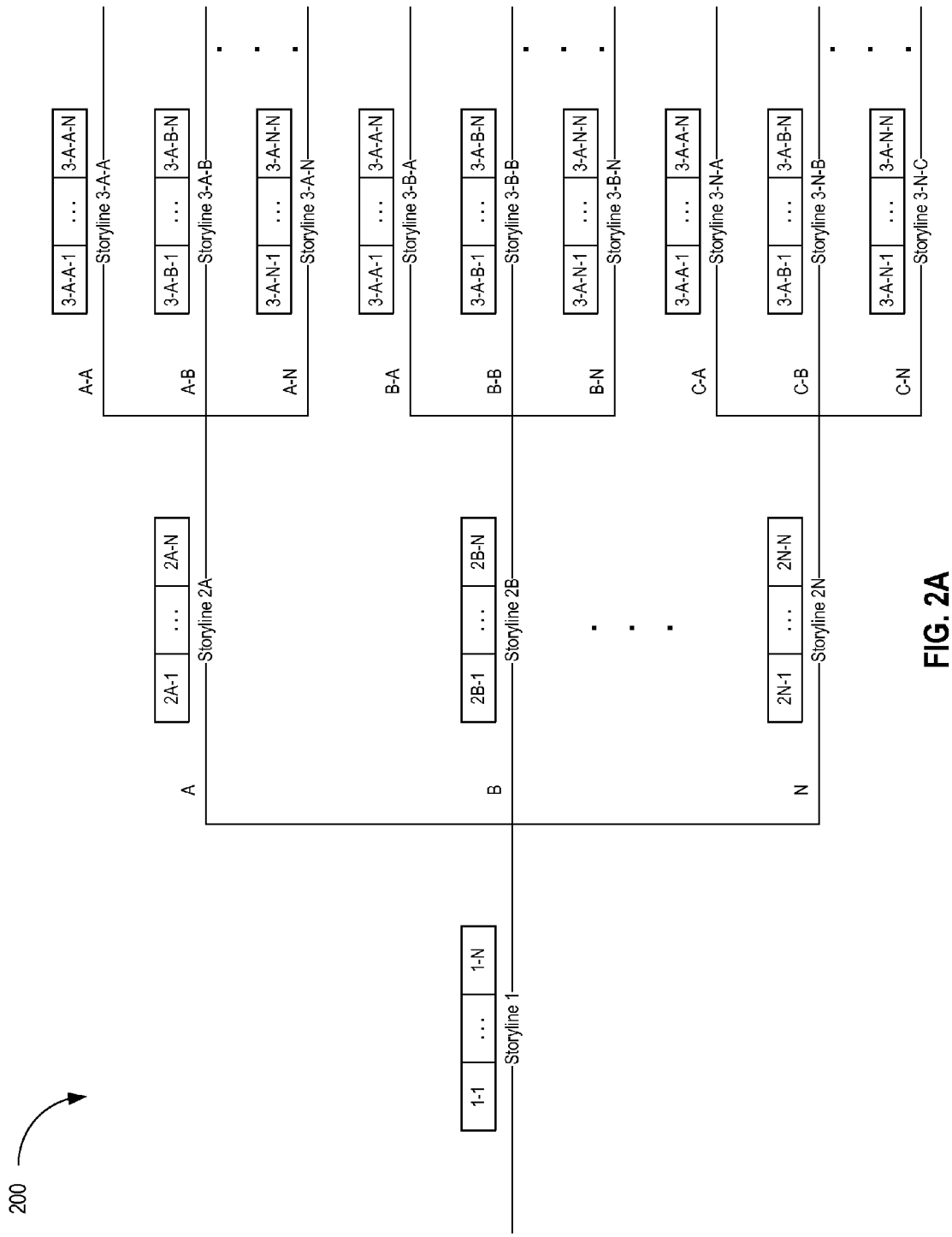
FIG. 2A illustrates an exemplary storyline map, according to one embodiment.

FIG. 2A illustrates an exemplary storyline map 200, according to one embodiment. As discussed above, the storyline map 200 defines the different storylines in a story for an interactive digital media item and may be used to identify different storylines of the story that may be presented to a user, based on user input received from the user. The story illustrated by the storyline map 200 starts with Storyline 1. Storyline 1 is associated with streaming video segments 1-1 through 1-N (e.g., a set of video segments). As the user views the video segments (e.g., the streaming video segments 1-1 through 1-N) that are associated with Storyline 1, the user may be presented with multiple storyline options (e.g., storyline options A through N). Each of the multiple storyline options (e.g., A through N) is associated with a corresponding storyline (e.g., storyline option A is associated with Storyline 2A, storyline option B is associated with Storyline 2B, etc.). Storylines 2A through 2N are each associated with a corresponding set of video segments. For example, Storyline 2A is associated with video segments 2A-1 through 2A-N, Storyline 2B is associated with video segments 2B-1 through 2B-N, etc. As the user views video segments associated with one of Storylines 2A through 2N, the user may be presented with additional storyline options. For example, if a user is viewing video segments associated with Storyline 2B, the user may be presented with storyline options B-A through B-N, each of which is associated with Storylines 3-B-A through 3-B-N, correspondingly.

In one embodiment, a server may use the storyline map 200 to identify a storyline and a corresponding set of video segments to provide to a media player. For example, a user may have previously selected storyline option A and may be viewing Storyline 2A (e.g., viewing video segments 2A-1 through 2A-N). Based on the user's previous selection of storyline option A, the server may determine that the only storyline options to be presented to the user are storyline options A-A through A-N (because the user has selected the Storyline 2A branch and the other storyline options B-A through B-N and C-A through C-N are not part of the Storyline 2A branch). If a user selects one of the storyline options, such as storyline option A-B, the server may use the storyline map 200 to identify the next set of streaming video segments to provide to the user (e.g., may identify segments 3-A-B-1 through 3-A-B-N).

In one embodiment, the different storylines may present a different number of storyline options. For example, one storyline may present two storyline options, but another storyline may present six storyline options. In another embodiment, the different storylines may be associated with different numbers of video segments. For example, one storyline may be associated with a set of 35 video segments, while another storyline may be associated with a set of 179 video segments.

FIG. 2B illustrates an exemplary storyline map 250, according to another embodiment. The storyline map 250 illustrates how the different storyline branches of a story in an interactive digital media item may converge into one of multiple endings for the story. While storyline map 200 (shown in FIG. 2A) illustrates a front/beginning portion of a storyline map, storyline map 250 illustrates the rear/ending portion of a storyline map. The storyline map 250 includes three main storyline branches, storyline branch 251, storyline branch 252, and storyline branch 253. The storyline branch 251 converges at the "Ending 1" for the story. The storyline branch 252 converges at the "Ending 2" for the story. The storyline branch 253 converges at the "Ending 3" for the story. Each of the storyline branches 251, 252, and 253 may correspond to different storyline options selected by the user. For example, if a user selects a first storyline option to go France at an earlier point in the interactive digital media item, then the story ends with Ending 1 (e.g., a character in the story gets married in France). In another example, if the user selects a second storyline option to go to Mexico at an earlier point in the interactive digital media item, then the story ends with Ending 2 (e.g., the character in the story retires in Mexico but never gets married).

FIG. 2C illustrates an exemplary storyline map 260, according to a further embodiment. The storyline map 260 illustrates how the different storyline branches of a story in an interactive digital media item may converge into a single ending for the story. While storyline map 200 (shown in FIG. 2A) illustrates a front/beginning portion of a storyline map, storyline map 260 illustrates the rear/ending portion of a storyline map. The storyline map 260 includes two main storyline branches, storyline branch 261 and storyline branch 262. Both storyline branches 261 and 262 converge at a common ending "Ending 4" for the story. For example, in a story about WWII, no matter what storyline options the user selects in the interactive digital media item (e.g., go to England or go to France), the story ends with common ending that the United States wins WWII and a character in the story returns to his hometown in the United States.

Figure 3B:
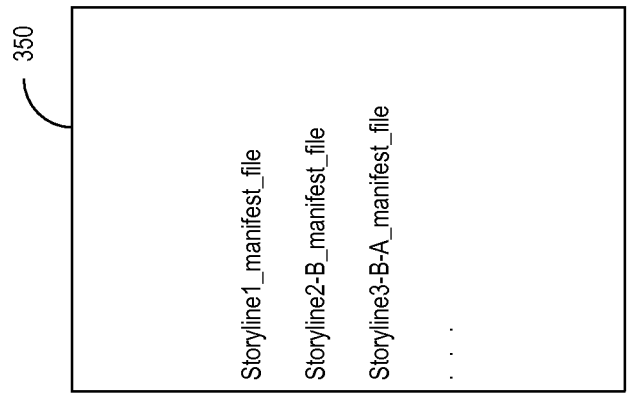
FIG. 3B illustrates an exemplary manifest file, according to a second embodiment.
Figure 3A:
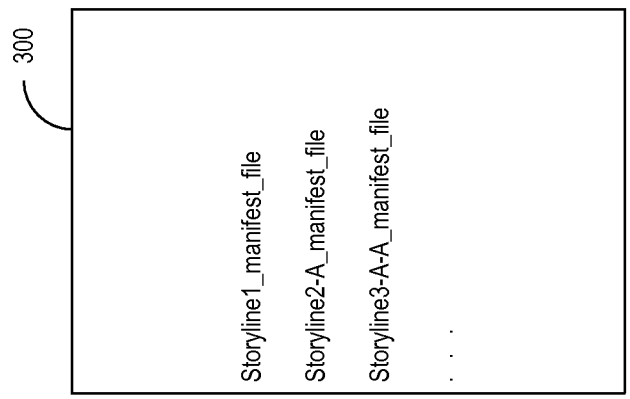
FIG. 3A illustrates an exemplary manifest file, according to a first embodiment.

FIG. 3A illustrates an exemplary manifest file 300, according to a first embodiment. The manifest file 300 may be a top-level manifest file (e.g., a manifest file that includes references—such as URLs—to other manifest files). The manifest file 300 may be provided to the user when the user begins to view an interactive digital media item. For example, no storyline options have been presented to the user when the user begins to view the interactive digital media item and the manifest file 300 may include references to default manifest files (e.g., to default storylines). The manifest file 300 includes references to three manifest files: Storyline1_manifest_file, Storyline2-A_manifest_file, and Storyline3-A-A_manifest_file. Referring to FIG. 2A, Storyline1_manifest_file is associated with Storyline 1, Storyline2-A_manifest_file is associated with Storyline 2A, and Storyline3-A-A_manifest_file is associated with Storyline 3A-A. In other embodiments, the manifest file 300 may include references to any number of manifest files. For example, the manifest file 300 may include references to 23 other manifest files, or 11 other manifest files, etc.

FIG. 3B illustrates an exemplary manifest file 350, according to a second embodiment. The manifest file 350 may be a top-level manifest file that has been updated after a user selects a particular storyline option. For example, while viewing Storyline 1, the user may select storyline option B. Referring to FIG. 3A, the second reference in the manifest file 300 was previously Storyline2-A_manifest_file. However, because the user selected storyline option B, the server may update the second reference in the manifest file 350 to Storyline2-B_manifest_file. After the server updates the second manifest file 350, the server may provide the second manifest file 350 to the client machine.

Figure 4:
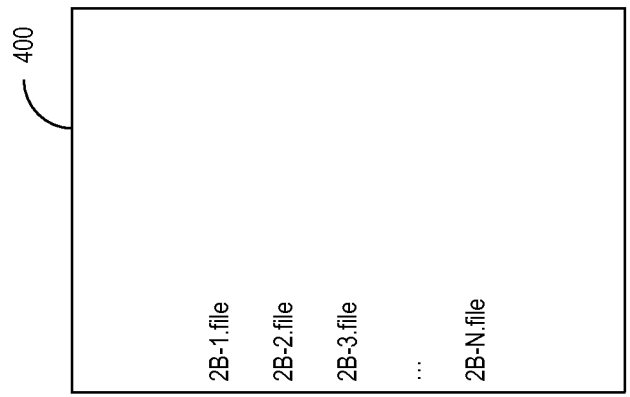
FIG. 4 illustrates an exemplary manifest file, according to a third embodiment.

FIG. 4 illustrates an exemplary manifest file 400, according to a third embodiment. The manifest file 400 may be lower-level manifest file. Referring to FIG. 3B, the manifest file 400 may be the manifest file Storyline2-B_manifest_file that is referred to in manifest file 350. The manifest file 400 includes references or pointers (e.g., URLs) to multiple video segments (e.g., to the files for the video segments). In one embodiment, each video segment may be stored in a memory as a separate file. For example, the first video segment associated with the Storyline 2B may be store as a filed named "2B-1.file," the second video segment associated with the Storyline 2B may be stored as a filed named "2B-2.file," etc.

FIG. 5A illustrates an exemplary manifest file 500, according to a fourth embodiment. The manifest file 500 may be a top-level manifest file (e.g., a manifest file that includes references—such as URLS—to other manifest files). The manifest file 500 includes references to three manifest files: Storyline1_manifest_file, Storyline2_manifest_file, and Storyline3_manifest_file.

FIG. 5B illustrates an exemplary manifest file 450, according to a fifth embodiment. The manifest file 550 may be a lower-level manifest file. Referring to FIG. 5A, the manifest file 450 may be the manifest file Storyline2_manifest_file that is referenced in the manifest file 400. The manifest file 450 includes references to multiple video segments (e.g., 2-1.file through 2-N.file).

FIG. 6 is a block diagram illustrating modifications to video file segments, according to one embodiment. As discussed above a server may not update a top-level manifest file to refer to a different lower-level manifest file when the server receives user input indicating a storyline option. Instead, the server may overwrite the video segments which are referred by the lower-level manifest file with different video segments that are associated with the storyline selected by the user. As shown in FIG. 6, the manifest file initially refers to video segments 2A-1 through 2A-N (indicated by the dashed line). The video segments 2A-1 through 2A-N may be associated with Storyline 2A as shown in FIG. 2A. When the user selects storyline option B (e.g., Storyline 2B), the video segments are replaced with the video segments 2B-1 through 2B-N, so that the manifest file now refers to 2B-1 through 2B-N (indicated by the solid line).

Figure 7:
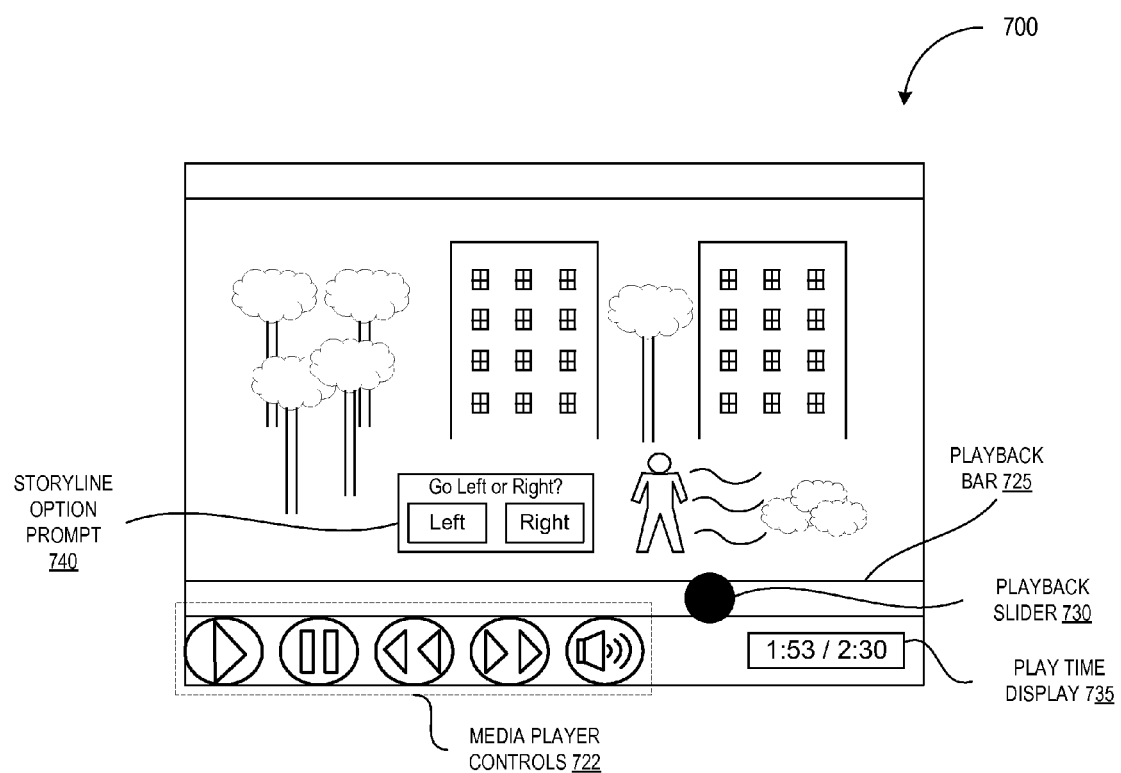
FIG. 7 is an exemplary media player, in accordance with one embodiment.

FIG. 7 is an exemplary media player 700, in accordance with one embodiment. The media player 700 may include media player controls 722 which may be used to control the playback/display of digital media items (e.g., interactive digital media items) in the media player 700. The media player controls 722 may be used to play, pause, fast forward, and rewind playback of the digital media item. The media player controls 722 may also be used to control the volume of the playback of the digital media item. The media player 700 may also include a play time display 735, a playback bar 725 and a playback slider 730. In one embodiment, the play time display 735 may display a current play time and/or a total play time for a particular storyline in the interactive digital media item. For example, a total play time (e.g., the total length) of a storyline of the interactive digital media item may be 2 minutes and 30 seconds (e.g., 2:30). The current play time may be current time/position in the playback of the storyline of the interactive digital media item (e.g., 1 minute and 53 seconds or 1:53). Playback slider 730 is positioned on a region of a playback bar 725 that corresponds to the current play time (e.g., 1:53). The playback slider 730 may be adjusted (e.g., dragged) to any other region of the playback bar 725 to adjust the current play time shown in the play time display 735.

The media player 700 also includes a storyline option prompt 740. The storyline option prompt 740 displays data indicative of two storyline options to the user (e.g., displays two buttons, a Left button and a Right button). The first storyline option is to go left, and the second storyline option is to go right. A user may provide user input selecting one of the storyline options (e.g., a user may click one of the buttons) and the media player 700 may provide data indicative of the user's selection to a server. As discussed above, the server may provide the media player with one or more video segments based on the user input. Although the storyline option prompt 740 shows two buttons, in another embodiment, the storyline option prompt 740 may use a variety of other GUI elements including, but not limited to, buttons, check boxes, text fields, radio buttons, drop down menus, etc. In a further embodiment, the storyline option prompt 740 may present any number of storyline options (e.g., may present 3 storyline options, or 8 storyline options, etc.).

Figure 8:
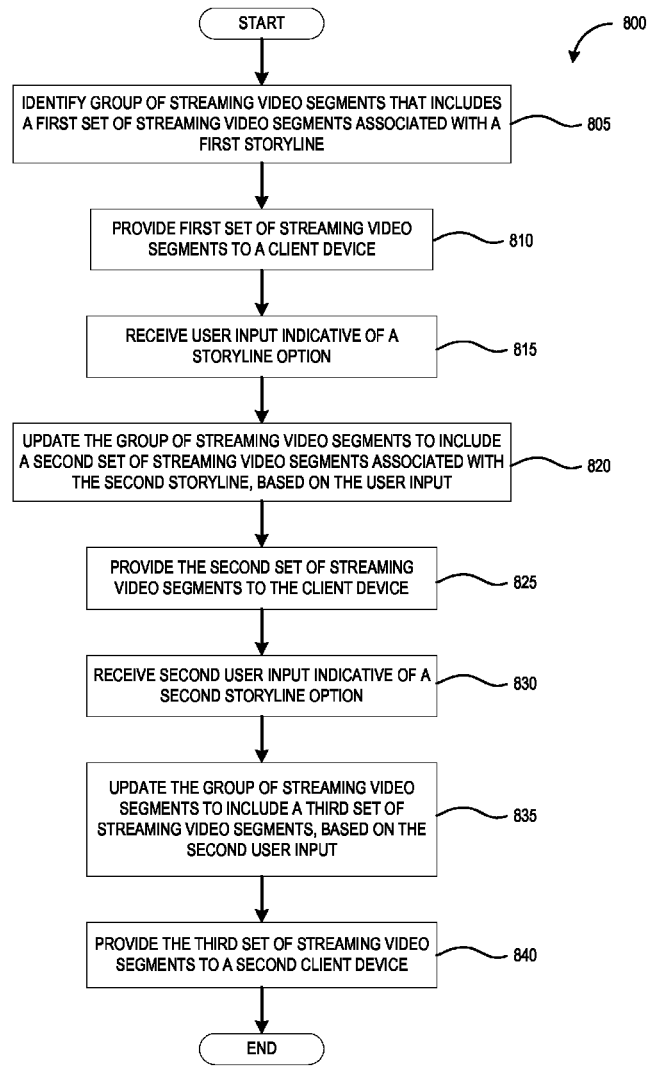
FIG. 8 is a flow diagram illustrating a method for providing interactive digital media items, according to one embodiment.
Figure 9:
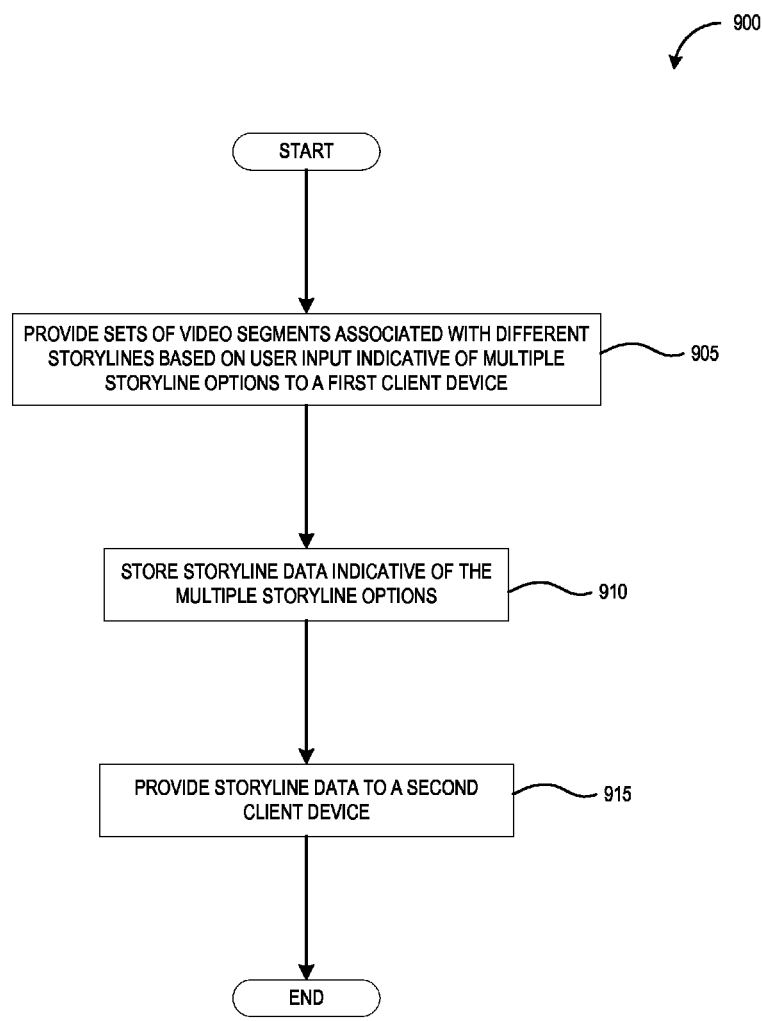
FIG. 9 is a flow diagram illustrating a method for providing storyline data to a computing device that includes a video game, according to one embodiment.
Figure 10:
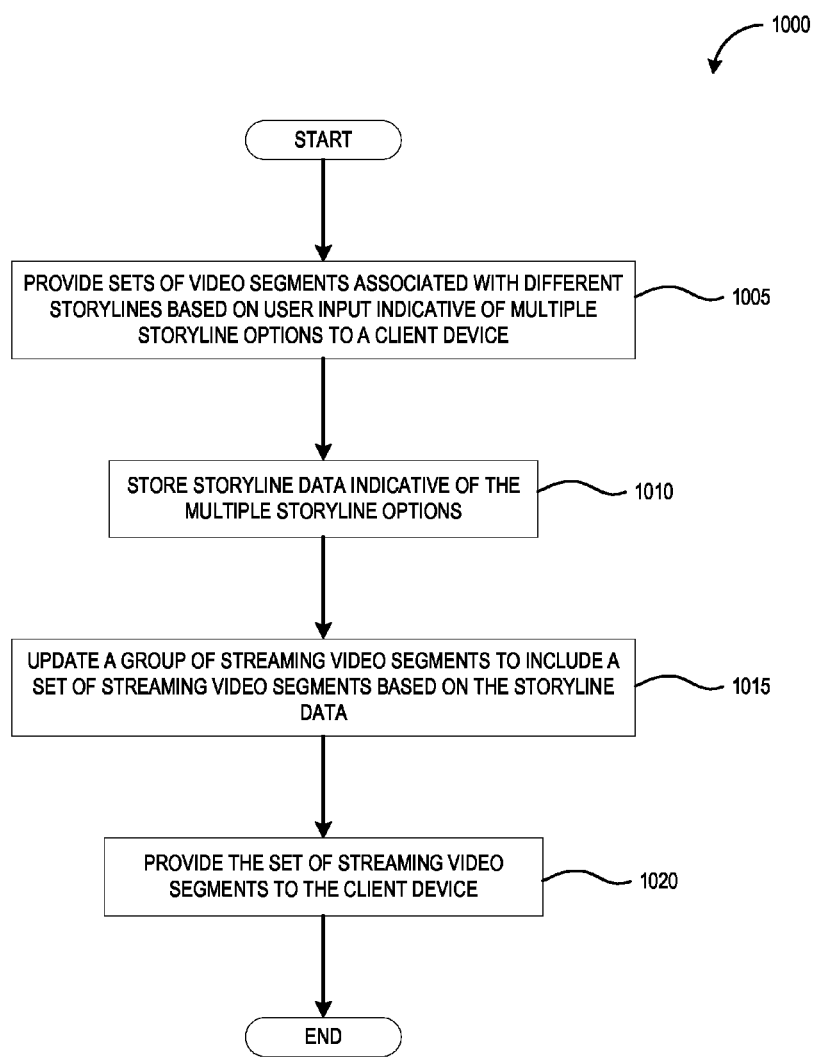
FIG. 10 is a flow diagram illustrating a method for providing interactive digital media items, according to another embodiment.

FIGS. 8-10 are flow diagrams illustrating methods for providing interactive digital media items. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one embodiment, the methods may be performed by a server machine (e.g., a server computer). Alternatively, the methods may be performed by a combination of a server machine and a client machine. For example, the operations of the methods may be divided between a client and server machine.

FIG. 8 is a flow diagram illustrating a method 800 for providing interactive digital media items, according to one embodiment. The method 800 may be performed by processing logic that may comprise hardware (circuitry, dedicated logic, etc.), software (such as is run on a general purpose computer system or a dedicated machine), or a combination of both. In one embodiment, the method 800 is performed by a server machine (e.g., a server computer).

Referring to FIG. 8, the method 800 begins at block 805 where the server machine identifies a group of streaming video segments (e.g., identifies an interactive digital media item) that includes a first set of streaming video segments associated with a first storyline. At block 810 the server machine provides the first set of streaming video segments to a client device (e.g., client device 102). In one embodiment, one or more of the first set of streaming video segments may provide a list of storyline options associated with the first storyline. At block 815, the server machine receives user input indicative of a storyline option selected by a user. The user input may be received from the client device. At block 820, the server machine updates the group of streaming video segments to include a second set of streaming video segments based on the user input (e.g., the server machine may update one or more manifest files). In one embodiment, the second set of streaming video segments are associated with a second storyline and were not previously included in the group of streaming video segments (e.g., because the second storyline was not previously selected by the user). At block 825, the server machine provides the second set of streaming video segments to the client device.

At block 830, the server machine receives a second user input indicative of a second storyline option selected by the user. In one embodiment, the second storyline option may be associated with the second storyline. At block 835, the server machine updates the group of streaming video segments to include a third set of streaming video segments based on the second user input. In one embodiment, the third set of video segments was not previously included in the group of streaming video segments. At block 835, the server machine provides the third set of video segments to a second client device (e.g., the user stops viewing the interactive digital media item on a first client device and continues viewing the interactive digital media item from a second client device). After block 835, the method 800 ends.

FIG. 9 is a flow diagram illustrating a method 900 for providing storyline data to a computing device that includes a video game, according to one embodiment. The method 900 may be performed by processing logic that may comprise hardware (circuitry, dedicated logic, etc.), software (such as is run on a general purpose computer system or a dedicated machine), or a combination of both. In one embodiment, the method 900 is performed by a server machine (e.g., a server computer). In one embodiment, the method 900 illustrates how storyline data associated with an interactive digital media item (e.g., the storyline options selected by a user while viewing the interactive digital media item) may affect the story in a video game associated with the interactive digital media item.

Referring to FIG. 9, the method 900 begins at block 905 where the server machine provides sets of streaming video segments associated with different storylines to a first client device (e.g., to a media player on the first client device), based on user input indicative of multiple storyline options selected by a user. For example, the user may have viewed an interactive digital media item and may have already selected one or more storyline options. The server machine may provide sets of streaming video segments, based on the selected storyline options. At block 910, the server machine stores storyline data indicative of one or more storyline options selected by the user, in a memory. At block 915, the server machine provides the storyline data to a second client device when the user starts to play a video game using a game engine on the second client device. As discussed above, the story and/or storylines of the video game may be updated based on the storyline data. For example, if the storyline data indicates that a particular character has disappeared, then the user may not be able to interact with the particular character in the video game. After block 915, the method 900 ends.

FIG. 10 is a flow diagram illustrating a method 1000 for providing interactive digital media items, according to another embodiment. The method 1000 may be performed by processing logic that may comprise hardware (circuitry, dedicated logic, etc.), software (such as is run on a general purpose computer system or a dedicated machine), or a combination of both. In one embodiment, the method 1000 is performed by a server machine (e.g., a server computer). In one embodiment, the method 1000 illustrates how storyline data from a video game associated with an interactive digital media item (e.g., the actions, events, and/or storylines in the video game) may affect the story and/or storylines of the interactive digital media item.

Referring to FIG. 10, the method 1000 begins at block 1005 where the server machine provides sets of streaming video segments associated with different storylines to a client device, based on user input indicative of multiple storyline options selected by a user. For example, the user may have viewed an interactive digital media item and may have already selected one or more storyline options. The server machine may provide sets of streaming video segments to the client device, based on the selected storyline options. At block 1010, the server machine stores storyline data indicative of the multiple storyline options selected by the user, in a memory. A portion of the storyline data may be received from a second client device that includes a game engine to run a video game. For example, as the user plays a video game on the second client device, the actions, events, and/or storyline options selected by a user in the video game may be stored on the server machine. At block 1015, the server machine updates a second group of streaming video segments (e.g., a second interactive digital media item) to include a set of streaming video segments based on the storyline data. For example, if the storyline data indicates that a character in the video game travelled to Italy, then the server machine may identify a storyline where the character is in Italy, and may update a group of video segments to include the video segments associated with the storyline. At block 1020, the set of streaming video segments is provided to a client device (e.g., client device 102). After block 1020, the method 1000 ends.

Figure 11:
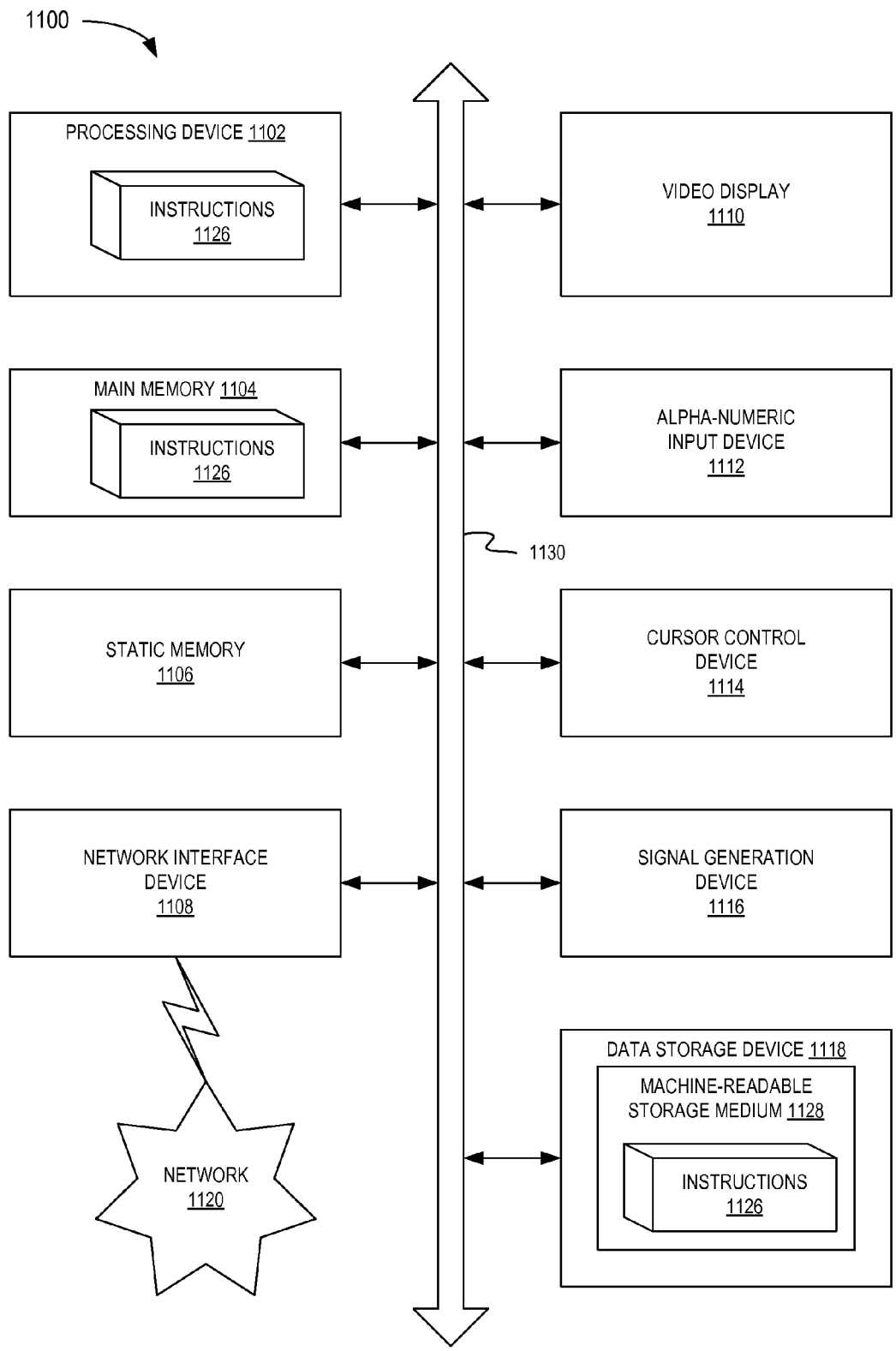
FIG. 11 is a block diagram of an exemplary computer system that may perform one or more of the operations described herein.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (e.g., a processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 is configured to execute the instructions 1126 for performing the operations and steps discussed herein.

The computer system 1100 may further include a network interface device 1108 which may communicate with a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse, a touch screen, a touch pad, a stylus, etc.), and a signal generation device 1116 (e.g., a speaker).

The data storage device 1118 may include a computer-readable medium 1128 on which is stored one or more sets of instructions (e.g., instructions 1126) embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "providing," "selecting," "updating," "adjusting," "modifying," "replacing," "using," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a server computer system, a group of streaming video segments, wherein the group of streaming video segments comprises a first set of streaming video segments that are associated with a first storyline;
   providing, by the server computer system, the first set of streaming video segments to a first client device, the first set of streaming video segments comprising data indicative of a set of storyline options associated with the first storyline;
   receiving first user input indicating a first user selection of a first storyline option from the set of storyline options associated with the first storyline;
   updating, by a processing device of the server computer system, the group of streaming video segments to include a second set of streaming video segments based on the first user input by updating a manifest file associated with the group of streaming video segments to include references to the second set of streaming video segments, wherein the second set of streaming video segments is associated with a second storyline and wherein the second set of streaming video segments was not previously included in the group of streaming video segments;
   providing the second set of streaming video segments to the first client device;
   receiving a second user input indicating a second user selection of a second storyline option from a second set of storyline options associated with the second storyline;
   updating the updated group of streaming video segments to include a third set of streaming video segments based on the second user input indicating the second user selection of the second storyline option associated with the second storyline, wherein the third set of streaming video segments is associated with a third storyline and wherein the third set of streaming video segments was not previously included in the updated group of streaming video segments; and
   providing the third set of streaming video segments to a second client device.

2. The method of claim 1, wherein the streaming video segments comprise pre-rendered streaming video segments.

3. The method of claim 1, wherein the first user input indicating the first user selection of the first storyline option comprises a Hypertext Transfer Protocol (HTTP) POST message.

4. The method of claim 1, further comprising:
   storing storyline data in a memory, wherein the storyline data is indicative of one or more storyline options selected by a user.

5. The method of claim 4, further comprising:
   providing the storyline data to the second client device, wherein the second client device updates the third storyline for a video game on the second client device, based on the storyline data.

6. The method of claim 4, further comprising:
   updating a second group of streaming video segments to include a fourth set of streaming video segments based on the storyline data, wherein a portion of the storyline data is received from a video game on the second client device and is associated with a fourth storyline corresponding to user input on the second client device; and
   providing the fourth set of streaming video segments to the first client device.

7. A system comprising:
   a memory configured to store streaming video segments; and
   a processing device coupled to the memory and configured to:
   identify a group of streaming video segments, wherein the group of streaming video segments comprises a first set of streaming video segments that are associated with a first storyline;
   provide the first set of streaming video segments to a first client device, the first set of streaming video segments comprising data indicative of a set of storyline options associated with the first storyline;
   receive first user input indicating a first user selection of a first storyline option from the set of storyline options associated with the first storyline;
   update the group of streaming video segments to include a second set of streaming video segments based on the first user input by updating a manifest file associated with the group of streaming video segments to include references to the second set of streaming video segments, wherein the second set of streaming video segments is associated with a second storyline and wherein the second set of streaming video segments was not previously included in the group of streaming video segments;
   provide the second set of streaming video segments to the first client device;
   receive a second user input indicating a second user selection of a second storyline option from a second set of storyline options associated with the second storyline;
   update the updated group of streaming video segments to include a third set of streaming video segments based on the second user input indicating the second user selection of the second storyline option associated with the second storyline, wherein the third set of streaming video segments is associated with a third storyline and wherein the third set of streaming video segments was not previously included in the updated group of streaming video segments; and
   provide the third set of streaming video segments to a second client device.

8. The system of claim 7, wherein the streaming video segments comprise pre-rendered streaming video segments.

9. The system of claim 7, wherein the first user input indicating the first user selection of the first storyline option comprises a Hypertext Transfer Protocol (HTTP) POST message.

10. The system of claim 7, wherein the processing device is further configured to:
    store storyline data in a memory, wherein the storyline data is indicative of one or more storyline options selected by a user.

11. The system of claim 10, wherein the processing device is further configured to:
provide the storyline data to the second client device, wherein the second client device updates the third storyline for a video game on the second client device, based on the storyline data.

12. The system of claim 10, wherein the processing device is further configured to:
update a second group of streaming video segments to include a fourth set of streaming video segments based on the storyline data, wherein a portion of the storyline data is received from a video game on the second client device and is associated with a fourth storyline corresponding to user input on the second client device; and
provide the fourth set of streaming video segments to the first client device.

13. A non-transitory computer readable storage medium having instructions that, when executed by a processing device, cause the processing device to perform a method comprising:
identifying a group of streaming video segments, wherein the group of streaming video segments comprises a first set of streaming video segments that are associated with a first storyline;
providing the first set of streaming video segments to a first client device, the first set of streaming video segments comprising data indicative of a set of storyline options associated with the first storyline;
receiving first user input indicating a first user selection of a first storyline option from the set of storyline options associated with the first storyline;
updating, by the processing device, the group of streaming video segments to include a second set of streaming video segments based on the first user input by updating a manifest file associated with the group of streaming video segments to include references to the second set of streaming video segments, wherein the second set of streaming video segments is associated with a second storyline and wherein the second set of streaming video segments was not previously included in the group of streaming video segments;
providing the second set of streaming video segments to the first client device;
receiving a second user input indicating a second user selection of a second storyline option from a second set of storyline options associated with the second storyline;
updating the updated group of streaming video segments to include a third set of streaming video segments based on the second user input indicating the second user selection of the second storyline option associated with the second storyline, wherein the third set of streaming video segments is associated with a third storyline and wherein the third set of streaming video segments was not previously included in the updated group of streaming video segments; and
providing the third set of streaming video segments to a second client device.

14. The non-transitory computer readable storage medium of claim 13,
wherein the method further comprises:
storing storyline data in a memory, wherein the storyline data is indicative of one or more storyline options selected by a user.

15. The non-transitory computer readable storage medium of claim 14, wherein the method further comprises:
providing the storyline data to the second client device, wherein the second client device updates the third storyline for a video game on the second client device, based on the storyline data.

16. The non-transitory computer readable storage medium of claim 14, wherein the method further comprises:
updating a second group of streaming video segments to include a fourth set of streaming video segments based on the storyline data, wherein a portion of the storyline data is received from a video game on the second client device and is associated with a fourth storyline corresponding to user input on the second client device; and
providing the fourth set of streaming video segments to the client device.

17. The non-transitory computer readable storage medium of claim 13, wherein the first user input indicating the first user selection of the first storyline option comprises a Hypertext Transfer Protocol (HTTP) POST message.

* * * * *